United States Patent
Sakaguchi

(10) Patent No.: US 9,602,684 B2
(45) Date of Patent: Mar. 21, 2017

(54) IMAGE FORMING APPARATUS, METHOD FOR CONTROLLING REMOTE OPERATION, AND STORAGE MEDIUM

(71) Applicant: CANON KABUSHIKI KAISHA, Tokyo (JP)

(72) Inventor: Toru Sakaguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/835,375

(22) Filed: Aug. 25, 2015

(65) Prior Publication Data

US 2016/0065759 A1     Mar. 3, 2016

(30) Foreign Application Priority Data

Aug. 26, 2014   (JP) ................. 2014-171646

(51) Int. Cl.
```
H04N 1/00       (2006.01)
G05B 15/02      (2006.01)
G06F 3/12       (2006.01)
H04B 5/00       (2006.01)
```
(52) U.S. Cl.
CPC ....... *H04N 1/00307* (2013.01); *G06F 3/1204* (2013.01); *G06F 3/1222* (2013.01); *G06F 3/1236* (2013.01); *G06F 3/1238* (2013.01); *G06F 3/1292* (2013.01); *H04B 5/0031* (2013.01); *H04N 2201/0039* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2013/0260682 | A1* | 10/2013 | Suzuki | H04W 88/06 455/41.1 |
| 2014/0082748 | A1* | 3/2014 | Gomi | G06F 21/6245 726/28 |

FOREIGN PATENT DOCUMENTS

| | | |
|---|---|---|
| JP | 2011-155495 A | 8/2011 |
| JP | 2012070068 A | 4/2012 |
| WO | 2003/038635 A1 | 5/2003 |

* cited by examiner

*Primary Examiner* — Thomas D Lee
(74) *Attorney, Agent, or Firm* — Canon USA Inc., IP Division

(57) ABSTRACT

An image forming apparatus includes an NFC control unit that performs proximity wireless communication with an information processing apparatus, a network control unit that performs communication with the information processing apparatus through a network, and an RUI control unit that accepts remote operation from the information processing apparatus. When a unique ID of an NFC tag of the information processing apparatus acquired by the NFC control unit, and an IP address of the information processing apparatus acquired by the network control unit identify the same information processing apparatus, the RUI control unit performs control so as to enable remote operation by the external device.

6 Claims, 12 Drawing Sheets

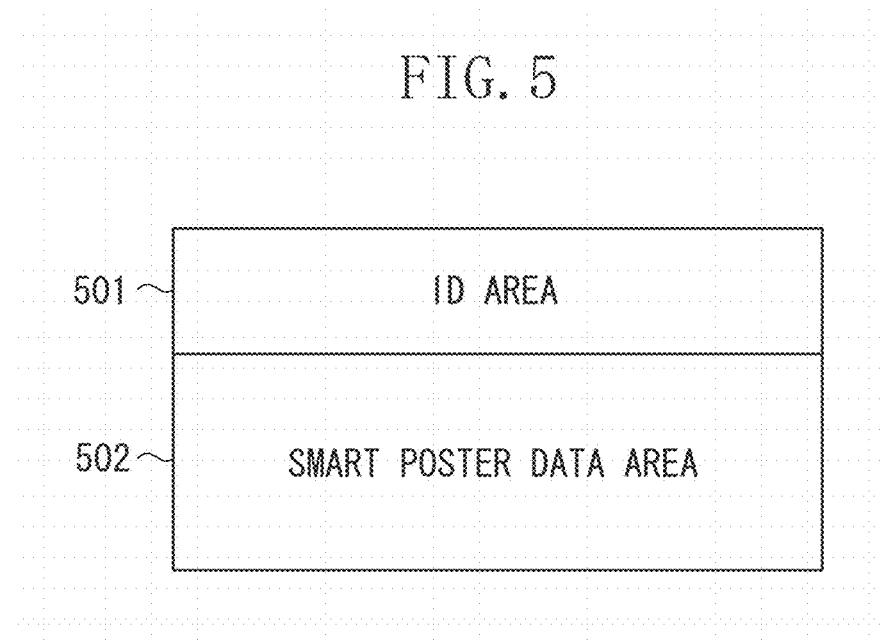

FIG. 6A

| NDEF Record [1] | NDEF Record [2] | NDEF Record [3] | ... |
|---|---|---|---|

| ADDRESS | NAME | INFORMATION TO BE WRITTEN |
|---|---|---|
| 0 × 0025 | Header | HEADER INFORMATION |
| 0 × 0026 | Type Length | SIZE OF Type |
| 0 × 0027 | Payload Length | SIZE OF Payload |
| 0 × 0028 | Type | TYPE OF Payload |
| 0 × 0029 ~ 0 × 0036 | Payload | DATA MAIN BODY |

| DEVICE STATUS 801 | PRESENCE/ABSENCE OF JOB 802 | URL OF RUI 803 |
|---|---|---|
| PAPER EXCHANGE BEFORE PRINTING | Y | URL OF PAPER FEED INFORMATION PAGE |
|  | N | URL OF TOP PAGE |
| PAPER MISMATCH AFTER PRINTING | Y | URL OF PAPER FEED INFORMATION PAGE |
|  | N | URL OF TOP PAGE |
| PRINTING IN PROGRESS | Y | URL OF JOB LIST PAGE |
|  | N | URL OF TOP PAGE |
| NO PAPER | — | URL OF PAPER FEED INFORMATION PAGE |
| DRUM LIFETIME | — | URL OF CONSUMABLES INFORMATION PAGE |
| OUT OF TONER | — | URL OF CONSUMABLES INFORMATION PAGE |
| OTHER STATUSES | — | URL OF TOP PAGE |

| UNIQUE ID OF MOBILE NFC TAG | IP ADDRESS | USER NAME | AUTHORITY |
|---|---|---|---|
| 123456 | 192.168.2.1 | admin | ADMINISTRATOR |
| abcdef | 192.168.2.11 | Guest | GENERAL USER |
| ... | ... | ... | ... |

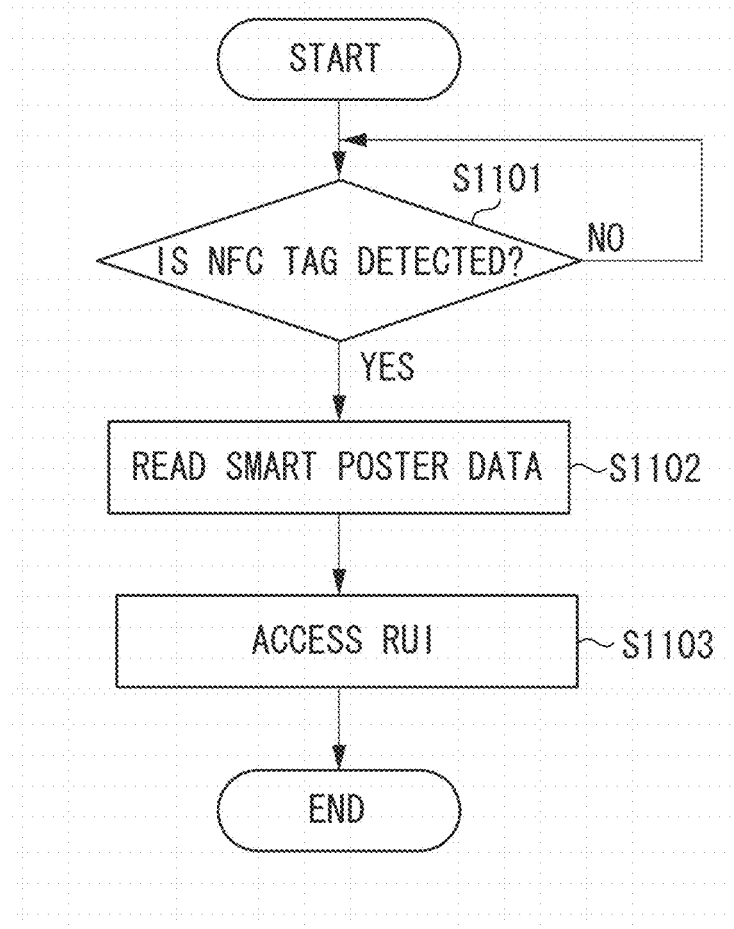

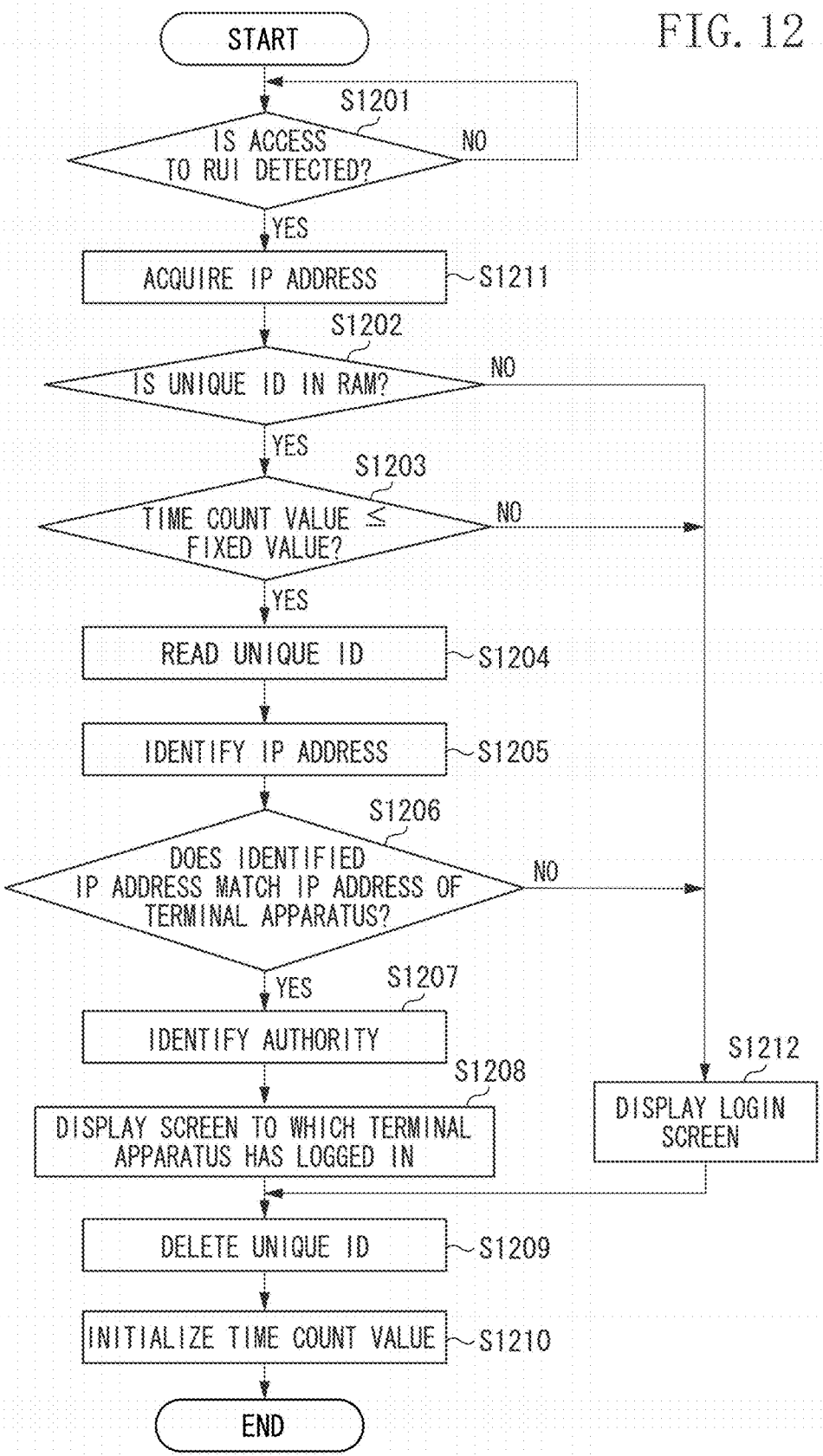

IMAGE FORMING APPARATUS, METHOD FOR CONTROLLING REMOTE OPERATION, AND STORAGE MEDIUM

BACKGROUND OF THE INVENTION

Field of the Invention

The present invention relates to a technology for controlling an image forming apparatus using proximity wireless communication.

Description of the Related Art

Near field communication (NFC) that is proximity wireless communication (non-contact communication) has a very short communication distance, and the communication becomes available by bringing devices equipped with NFC close to each other within several [cm]. Technologies using the NFC include "smart poster", for example. In the smart poster, an NFC tag in which information is written is attached to a poster. An NFC reader/writer reads the information from the NFC tag when brought close to the NFC tag. For example, an NFC tag in which a uniform resource locator (URL) of an official site of a movie is written is attached to a poster of the movie. A user reads the URL from the NFC tag attached to the poster with a portable information processing apparatus equipped with the NFC reader/writer, such as a smart phone. Accordingly, the information processing apparatus can display the official site of the movie with a web browser. The information processing apparatus is equipped with the web browser in order to display the official site, in using a service by the smart poster. However, other special software is unnecessary.

Meanwhile, some image forming apparatuses such as a copying machine and a multifunction peripheral can transmit/receive data to/from the information processing apparatuses such as a personal computer (PC) and a smart phone through a network such as a local area network (LAN). Some of the image forming apparatuses include a remote user interface (RUI). The "RUI" provides an interface for remotely managing and operating the image forming apparatus by an external device like the information processing apparatus. The information processing apparatus can manage and operate, through the web browser, the image forming apparatus equipped with the RUI. The image forming apparatus has internal software (a web server) for the RUI. The information processing apparatus can remotely manage/operate the image forming apparatus without requiring special software other than the web browser. The user starts the web browser of the information processing apparatus, and specifies a URL of the RUI (for example, an internet protocol (IP) address) of the image forming apparatus. Accordingly, a web page (RUI screen) transmitted from the image forming apparatus is displayed on the web browser of the information processing apparatus. The user can perform confirmation of a status of the image forming apparatus or a job history, and various types of setting and the like, through the RUI screen displayed on the web browser. The RUI includes a general user mode and an administrator mode. When the RUI screen is displayed on the web browser, the user selects either the general user mode or the administrator mode on a top page of the RUI screen, and logs in. Setting and operations related to the management of the image forming apparatus can be performed only in the administrator mode. Therefore, while an input of a password is unnecessary when the user logs in to the general user mode, the input of a password is necessary when the user logs in to the administrator mode.

If the image forming apparatus and the information processing apparatus can perform communication by the NFC, the information processing apparatus can remotely manage/operate the image forming apparatus using the RUI and the NFC. In this case, both of the image forming apparatus and the information processing apparatus include the NFC reader/writer and the NFC tag. The information processing apparatus is a portable information terminal apparatus. The NFC tag of the image forming apparatus stores the URL of the RUI. The information terminal apparatus is brought close to the NFC tag of the image forming apparatus, reads the URL of the RUI by the NFC, and displays the RUI screen on the web browser by accessing the read URL.

By use of the RUI and the NFC in this way, the information processing apparatus can be used as a display device of the image forming apparatus, which displays the RUI screen. Such use is effective especially in an image forming apparatus that does not include a display device. Further, even in an image forming apparatus that includes the display device, a similar function to the display device can be realized by the information processing apparatus when the display device of the image forming apparatus is in use. Security between the image forming apparatus and the information processing apparatus is important in the remote management/operation by the information processing apparatus. In Japanese Patent Application Laid-Open No. 2011-155495, an image forming apparatus including an NFC reader/writer determines validity of a user based on certificate information of each user that is held in a device accessing the image forming apparatus by the NFC.

The user of the information processing apparatus that performs remote operation by the RUI needs to select either the general user mode or the administrator mode on the top page of the RUI screen and log in every time of an access. Further, when the user logs in to the administrator mode, the input of a password is necessary. This causes a decrease in operability of the user. Further, it is necessary to switch the screen in order from the top page of the RUI screen to an intended page. This also causes the decrease in operability of the user.

SUMMARY OF THE INVENTION

The present invention is directed to an image forming apparatus that improves operability of a user of an information processing apparatus that performs remote operation, while maintaining security.

According to an aspect of the present invention, an image forming apparatus includes an NFC control unit configured to perform proximity wireless communication with an external device, a network control unit configured to perform communication with the external device through a network, and an RUI control unit configured to accept remote operation from the external device, wherein, in a case where first identification information acquired by the NFC control unit and second identification information acquired by the network control unit identify the same external device, the RUI control unit performs control so as to enable the remote operation by the external device.

Further features of the present invention will become apparent from the following description of exemplary embodiments with reference to the attached drawings.

BRIEF DESCRIPTION OF THE DRAWINGS

FIG. 5 is a diagram illustrating an example of a memory map of a near field communication (NFC) tag.

FIGS. 6A and 6B are explanatory diagrams of a data structure of an NFC data exchange format (NDEF).

FIG. 8 is a diagram illustrating an example of a uniform resource locator (URL) management table.

FIG. 9 is a diagram illustrating an example of a user management table.

FIG. 11 is a flowchart illustrating processing performed by the information processing apparatus when the information processing apparatus is brought close to the image forming apparatus.

FIG. 12 is a flowchart illustrating processing performed by the image forming apparatus when there is an access to a remote user interface (RUI).

DESCRIPTION OF THE EMBODIMENTS

Hereinafter, exemplary embodiments will be described in detail with reference to the drawings.
<Configuration>

Figure 1:
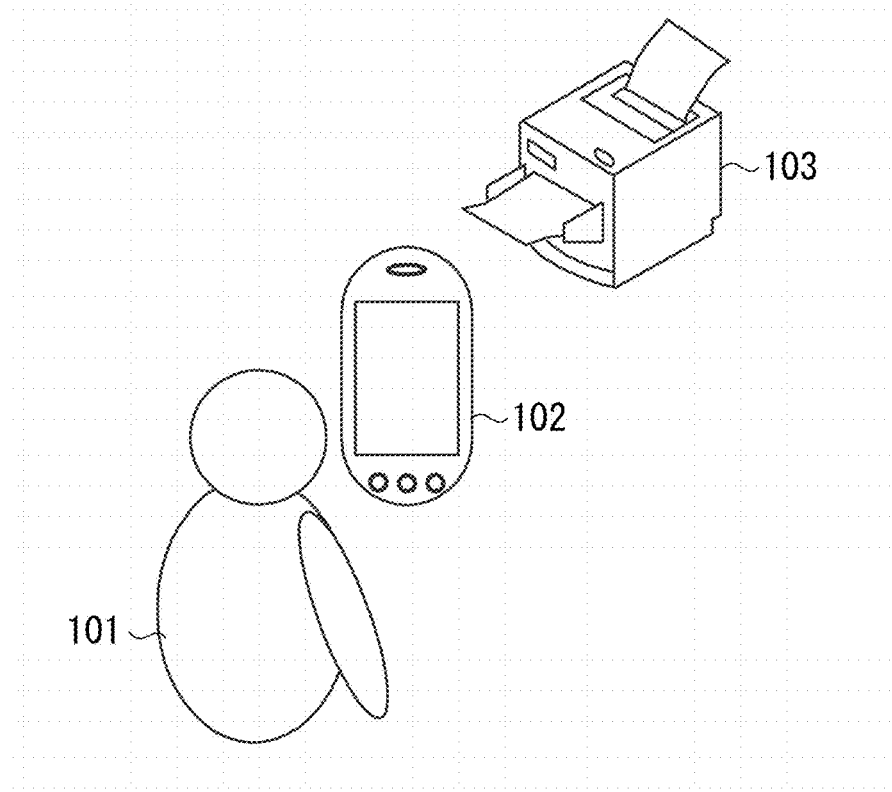
FIG. 1 is a schematic diagram of the present exemplary embodiment.

FIG. 1 is a schematic diagram of the present exemplary embodiment. A user 101 can perform communication by near field communication (NFC) by bringing an information processing apparatus 102 close to an image forming apparatus 103. Further, the information processing apparatus 102 and the image forming apparatus 103 can transmit/receive data through a network such as a LAN. The information processing apparatus 102 is a portable information terminal apparatus such as a smart phone. The image forming apparatus 103 is a host base printer that does not include a display device in the present exemplary embodiment, but is not limited to this, and may be the one of a highly-functional device type such as a multifunction peripheral (MFP).

Figure 2:
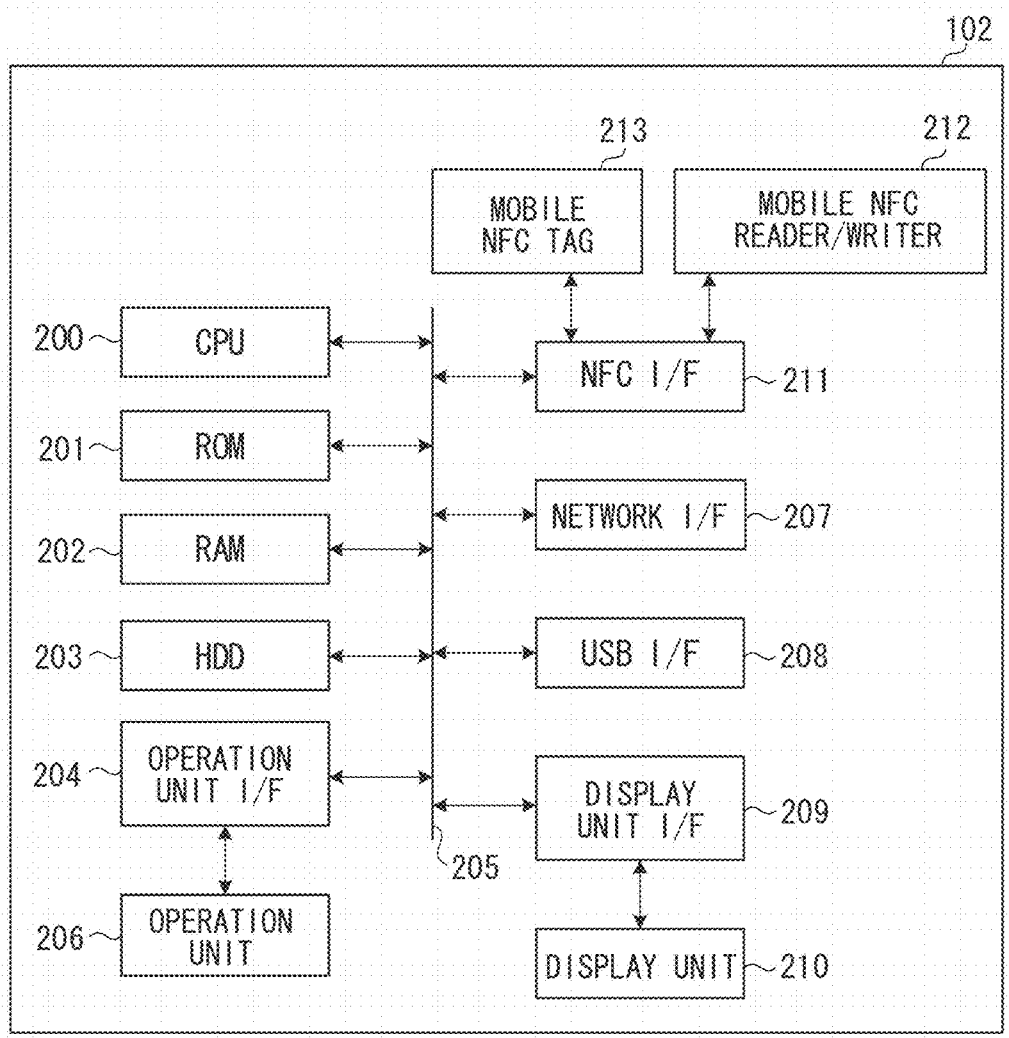
FIG. 2 is a hardware configuration diagram of an information processing apparatus.

FIG. 2 is a hardware configuration diagram of the information processing apparatus 102. The information processing apparatus 102 is equipped with a web browser, and can perform proximity wireless communication and communication through a network. The information processing apparatus 102 is an example of an external device that remotely controls the image forming apparatus 103 by a remote user interface (RUI). Configuration elements of the information processing apparatus 102 are connected to a system bus 205, and can mutually transmit/receive data.

An overall operation of the information processing apparatus 102 is controlled by a central processing unit (CPU) 200. The CPU 200 realizes various functions necessary for the control of the information processing apparatus 102 by reading computer programs from a storage medium such as a read-only memory (ROM) 201 and a hard disk drive (HDD) 203, and executing the computer programs. The CPU 200 uses a random access memory (RAM) 202 as a work area in executing the computer programs. The HDD 203 stores a computer program for realizing the web browser. The CPU 200 can realize the web browser by executing the computer program.

The information processing apparatus 102 includes, as an input device, an operation unit 206 connected to an operation unit interface (I/F) 204. The operation unit I/F 204 accepts an input from the operation unit 206, and transmits the input to the CPU 200. The information processing apparatus 102 includes, as an output device, a display unit 210 connected to a display unit I/F 209. The display unit I/F 209 causes the display unit 210 to display a screen according to the control of the CPU 200. For example, the display unit I/F 209 causes the display unit 210 to display the screen of the web browser at the time of starting the web browser. The user 101 can input an instruction to the information processing apparatus 102 with the operation unit 206 while viewing the screen of the web browser displayed on the display unit 210. Especially, when the image forming apparatus 103 is remotely controlled by the RUI, a web page (RUI screen) transmitted from the image forming apparatus 103 is displayed on the web browser displayed on the display unit 210.

The information processing apparatus 102 includes a network I/F 207 in order to perform communication through the network. The network I/F 207 enables communication through the network by at least one of a wired network and a wireless network. The information processing apparatus 102 includes a universal serial bus (USB) I/F 208 for an interface with an external device.

The information processing apparatus 102 includes a mobile NFC reader/writer 212 and a mobile NFC tag 213 that are connected to an NFC I/F 211 in order to perform the proximity wireless communication. The NFC I/F 211 transmits data to the mobile NFC reader/writer 212 and the mobile NFC tag 213 by the control of the CPU 200. Further, the NFC I/F 211 transmits data from the mobile NFC reader/writer 212 to the CPU 200. The mobile NFC reader/writer 212 generates an electromagnetic field to perform the proximity wireless communication with another device (image forming apparatus 103) equipped with the NFC. The mobile NFC reader/writer 212 reads information written in an NFC tag equipped in the other device, and writes information to the NFC tag, by the proximity wireless communication. The mobile NFC tag 213 includes a data storage area for enabling the proximity wireless communication with an NFC reader/writer of the other device. The mobile NFC reader/writer 212 is, for example, a radio-frequency identification (RFID) reader/writer, and the mobile NFC tag 213 is, for example, an integrated circuit (IC) tag.

Figure 3:
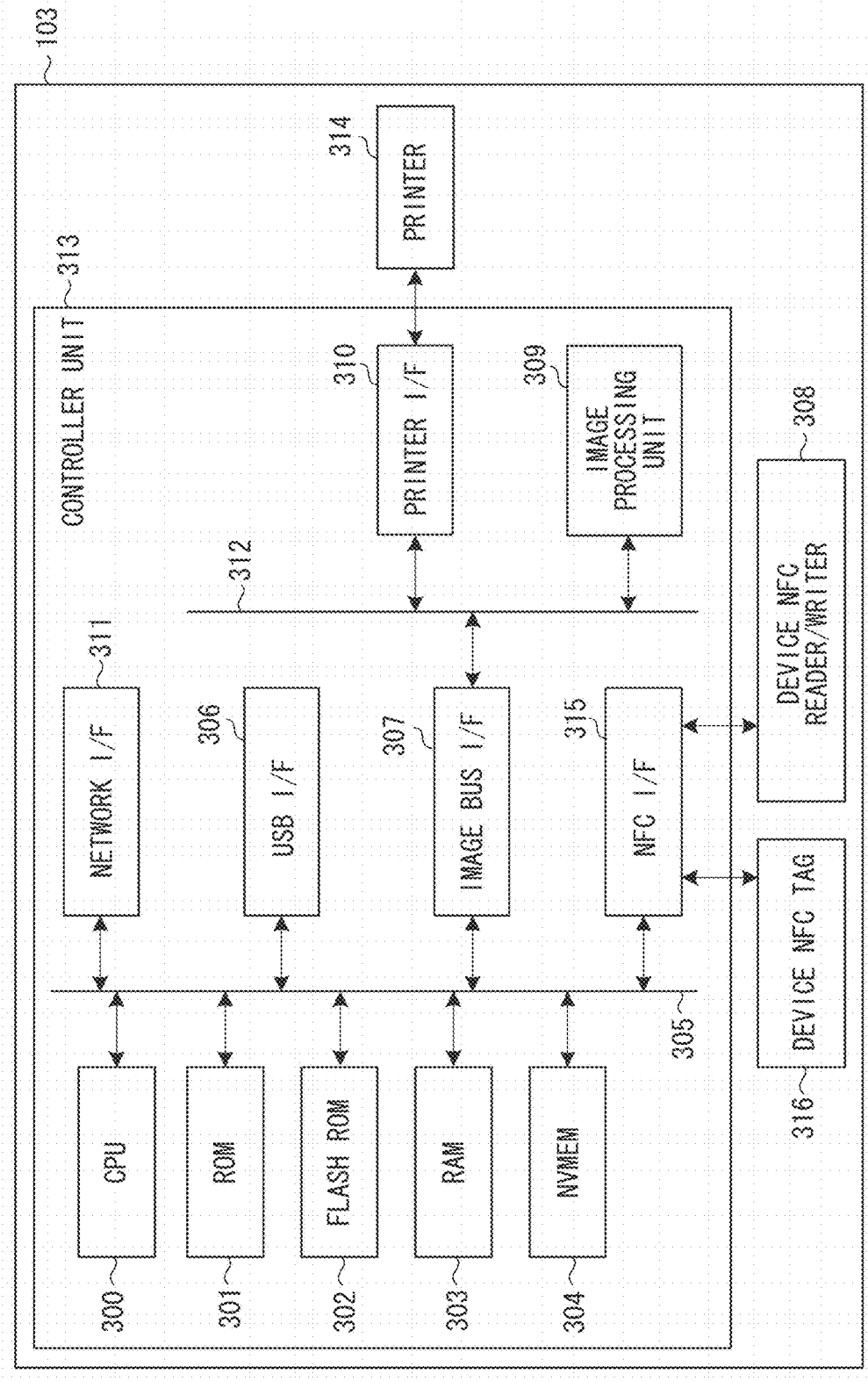
FIG. 3 is a hardware configuration diagram of an image forming apparatus.

FIG. 3 is a hardware configuration diagram of the image forming apparatus 103. The image forming apparatus 103 includes an RUI, and can perform the proximity wireless communication and communication through the network. The image forming apparatus 103 includes a controller unit 313, a printer 314, a device NFC reader/writer 308, and a device NFC tag 316.

The controller unit 313 controls an overall operation of the image forming apparatus 103. The controller unit 313 outputs image data to the printer 314 and controls an operation of the printer 314 in an image forming process, for example. Therefore, the controller unit 313 realizes various functions necessary for the control of the image forming apparatus 103 by a CPU 300 reading computer programs from a storage medium such as a ROM 301 and a flash ROM 302 and executing the computer programs. The CPU 300 uses a RAM 303 as a work area in executing the computer programs. The RAM 303 is also used as an image memory that stores the image data. A non-volatile memory (NVMEM) 304 stores setting information of the image forming apparatus 103 and the like.

The image forming apparatus 103 includes a network I/F 311 in order to perform communication through the network. The network I/F 311 enables communication through the network by at least one of a wired network and a wireless network. The image forming apparatus 103 includes a USB I/F 306 for an interface with an external device.

The image forming apparatus 103 includes an NFC I/F 315. The NFC I/F 315 transmits data to the device NFC reader/writer 308 and the device NFC tag 316 by the control of the CPU 300. Further, the NFC I/F 315 transmits data from the device NFC reader/writer 308 to the CPU 300. The device NFC reader/writer 308 generates an electromagnetic field to perform the proximity wireless communication with another device (information processing apparatus 102) equipped with the NFC. The device NFC reader/writer 308 can read information written in the NFC tag equipped in the other device, and write information to the NFC tag, by the proximity wireless communication. The device NFC tag 316 includes a data storage area for enabling the proximity wireless communication with the NFC reader/writer of the other device. The device NFC reader/writer 308 is, for example, an RFID reader/writer, and the device NFC tag 316 is, for example, an IC tag.

The CPU 300, the ROM 301, the flash ROM 302, the RAM 303, the non-volatile memory 304, the network I/F 311, the USB I/F 306, and the NFC I/F 315 are connected to a system bus 305, and can mutually transmit/receive data. The system bus 305 is connected to an image bus 312 that can perform high-speed transfer of image data, via an image bus I/F 307. The image bus I/F 307 is a bus bridge that converts a data structure of the image data. The image bus 312 is formed by a peripheral component interconnect (PCI) bus or an Institute of Electrical and Electronics Engineers (IEEE) 1394 bus. An image processing unit 309 and a printer I/F 310 are connected to the image bus 312.

The image processing unit 309 corrects, process, and edits the image data, converts a resolution of the image data, and the like. In addition, the image processing unit 309 rotates an image and performs a compression/decompression process. The printer I/F 310 connects the printer 314 and the controller unit 313, and performs synchronous/asynchronous conversion and transmission/reception of the image data. The printer 314 converts raster image data into an image, and forms the image on a sheet. The printer 314 performs image formation by an electrophotographic system using a photosensitive drum and a photosensitive belt, for example. The image forming process is controlled by an instruction from the CPU 300.

Figure 4:
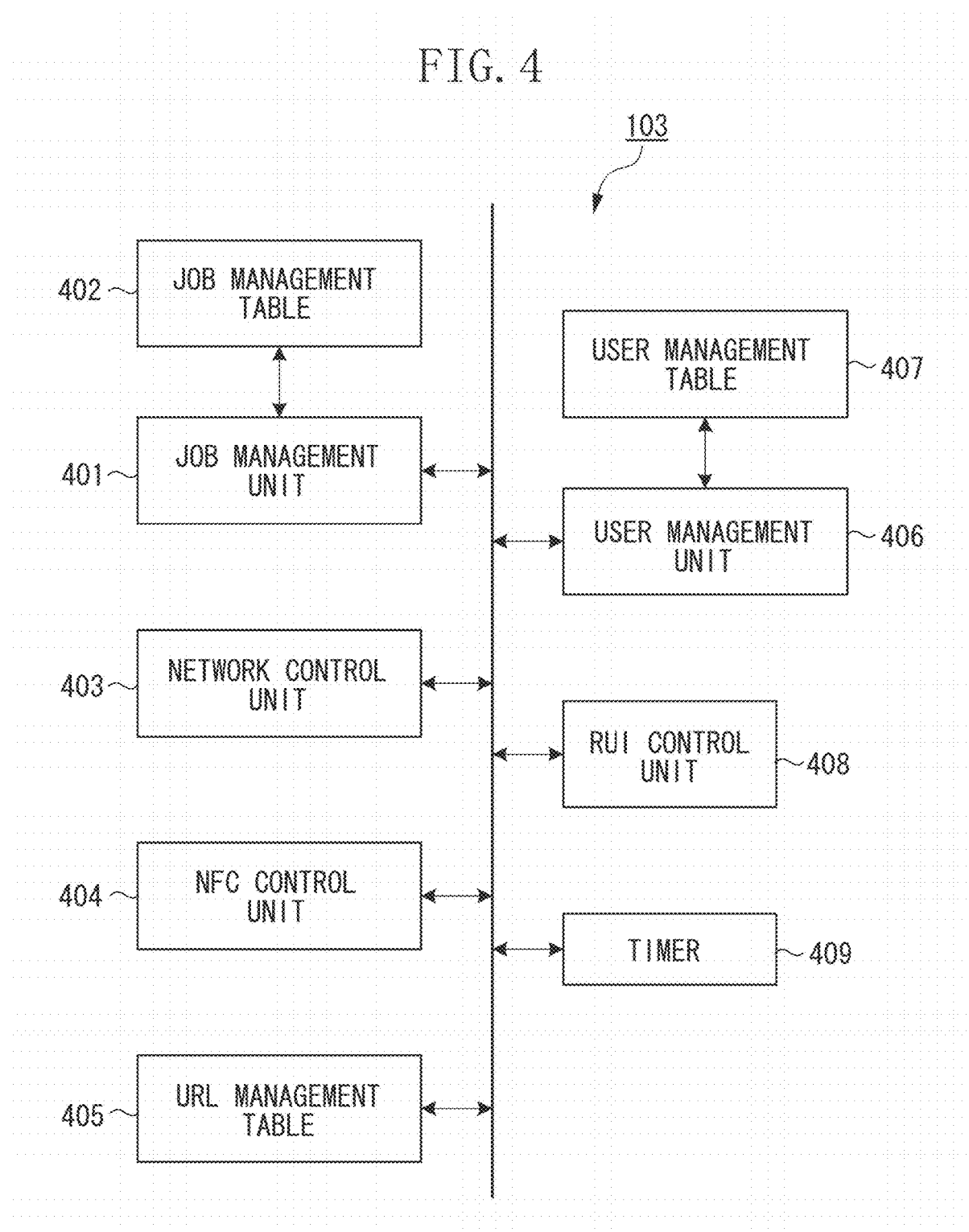
FIG. 4 is a functional block diagram of the image forming apparatus.

FIG. 4 is a functional block diagram illustrating functions realized by the controller unit 313 of the image forming apparatus 103. Each functional block is realized by the CPU 300 of the controller unit 313 executing a computer program. In the image forming apparatus 103, a job management unit 401, a job management table 402, a network control unit 403, an NFC control unit 404, a uniform resource locator (URL) management table 405, a user management unit 406, a user management table 407, an RUI control unit 408, and a timer 409 are formed.

The job management unit 401 manages a job being executed in the image forming apparatus 103, using the job management table 402. When the job occurs, the job management unit 401 writes information, such as a user name of a user who has requested the job and a type of the job, into the job management table 402, and deletes the information of the job from the job management table 402 when the job is terminated. The job management table 402 is stored in the RAM 303, for example.

The network control unit 403 controls the network I/F 311 to perform communication through the network.

The NFC control unit 404 controls the NFC I/F 315 to perform the proximity wireless communication. Therefore, the NFC control unit 404 reads data from an NFC tag of another device, and performs communication with an NFC reader/writer of the other device, by the device NFC reader/writer 308. Further, the NFC control unit 404 writes smart poster data, to which a unique ID is added, into the device NFC tag 316. FIG. 5 is a diagram illustrating an example of a memory map of the device NFC tag 316. An ID area 501 and a smart poster data area 502 are provided in the device NFC tag 316.

The ID area 501 is typically an area into which the unique ID for identifying the NFC tag is written. The unique ID is identification information of the NFC tag that is uniquely allocated to the NFC tag. The mobile NFC tag 213 of the information processing apparatus 102 similarly includes an ID area into which a unique ID is written. The smart poster data area 502 is an area into which smart poster data complying with an NFC data exchange format (NDEF) is written. FIGS. 6A and 6B are explanatory diagrams of a data structure in the NDEF format.

According to FIG. 6A, data in the NDEF format is encapsulated in an NDEF message 601, and includes one or more NDEF records. According to FIG. 6B, an NDEF record 602 includes fields 603 to 607 respectively indicating a "Header", a "Type Length", a "Payload Length", a "Type", and a "Payload". In the "Header" field 603, information such as whether the NDEF record is positioned first or last in the NDEF message 601, and the size of the NDEF message 601 are written. In the "Type Length" field 604, the size of the "Type" field 606 is written. In the "Payload Length" field 605, the size of the "Payload" field 607 is written. In the "Type" field 606, a type of the "Payload" field 607 is written. The type of the "Payload" field 607 includes "Sp" and "U", for example. In the case of "Sp", the "Payload" field 607 is interpreted as the smart poster data, and in the case of "U", the "Payload" field 607 is interpreted as an URL. The "Payload" field 607 is a data main body of the NDEF record 602.

Figure 7:
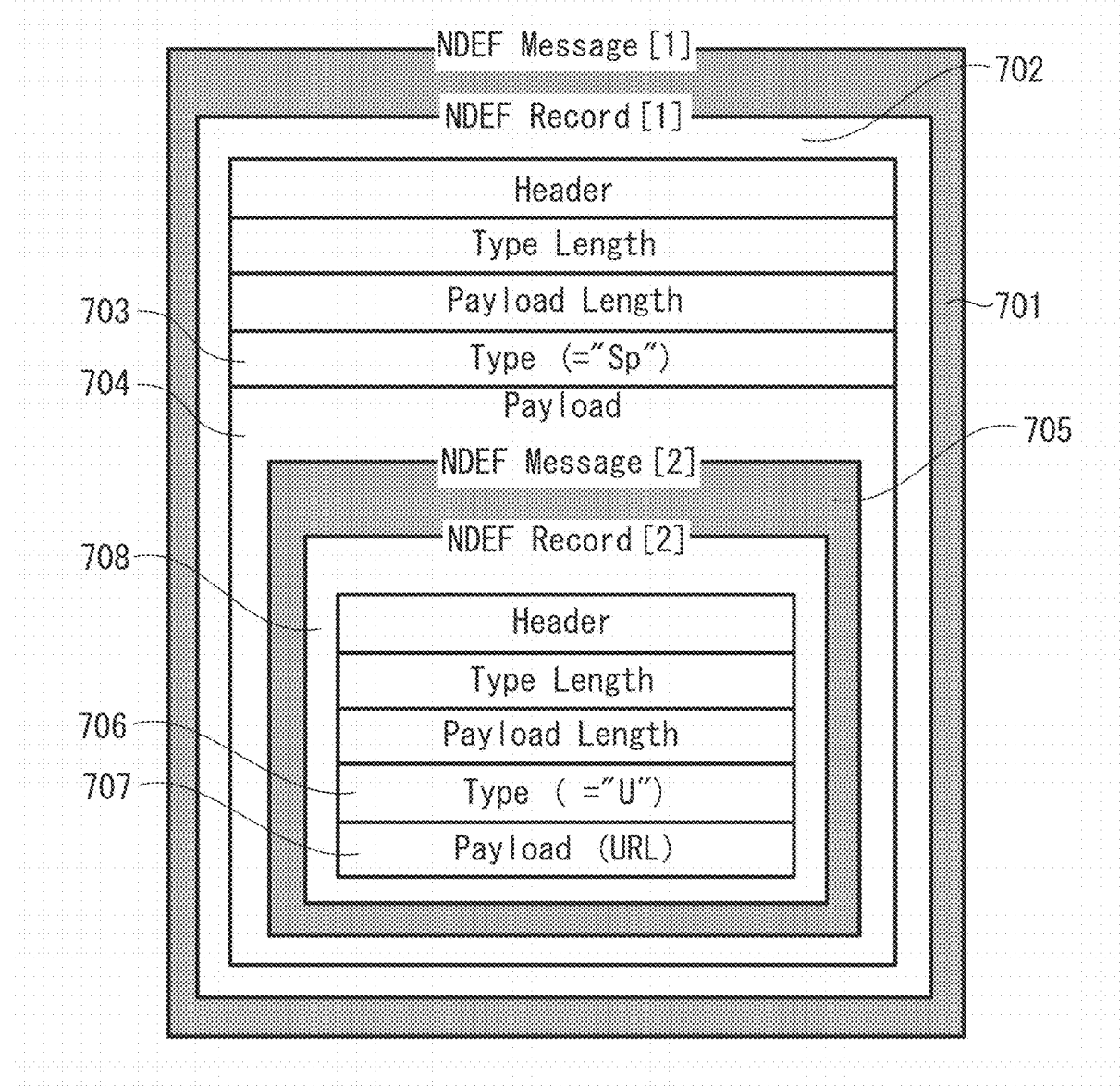
FIG. 7 is an explanatory diagram of a structure of smart poster data.

FIG. 7 is an explanatory diagram of a structure of the smart poster data written in the smart poster data area 502. An NDEF message 701 of the smart poster data has a nested structure in which an NDEF message 705 is stored in a "Payload" field 704 of an NDEF record 702. "Sp" is written in a "Type" field 703 of the NDEF record 702 included in the NDEF message 701, and indicates that the "Payload" field 704 is the smart poster data. "U" is written in a "Type" field 706 of an NDEF record 708 included in the NDEF message 705, and indicates that a "Payload" field 707 stores the URL.

The NFC control unit 404 of the image forming apparatus 103 writes a URL of the RUI into the "Payload" field 707 of the smart poster data of the smart poster data area 502 of the device NFC tag 316. The URL to be written in the "Payload" field 707 of the NDEF record 708 is determined based on the URL management table 405.

The URL management table 405 stores the URL of the web page (RUI screen) to be displayed on the information processing apparatus 102 of the user who performs the remote operation, based on a state of the image forming apparatus 103. The URL management table 405 is stored in the flash ROM 302, for example. FIG. 8 is a diagram illustrating an example of the URL management table 405.

In a "device status" 801, the state of the image forming apparatus 103 is stored. In "URL of RUI" 803, a URL corresponding to the "device status" 801 is stored. When the URL is different depending on "presence/absence of job" 802 of the user who performs the remote operation, a URL according to the "presence/absence of job" 802 is stored in the "URL of RUI" 803.

The NFC control unit 404 determines the URL of the RUI by referring to the URL management table 405, according to the state of the image forming apparatus 103 at the time when the device NFC reader/writer 308 reads the unique ID from the mobile NFC tag 213. When the URL is different depending on the presence/absence of job, the NFC control unit 404 confirms the presence/absence of job by referring to the job management table 402 by the job management unit 401, and determines the URL of the RUI. For example, if the state of the image forming apparatus 103 at the time of reading the unique ID from the mobile NFC tag 213 is "printing in progress", the NFC control unit 404 confirms the presence/absence of job of the user of the unique ID based on the job management table 402. As a result of the confirmation, if there is a job, the NFC control unit 404 determines a "URL of job list page" as a URL to be written into the "Payload" field 707 of the NDEF record 708. If there is no job, the NFC control unit 404 determines a "URL of top page" as the URL to be written into the "Payload" field 707 of the NDEF record 708. Further, if the state of the image forming apparatus 103 at the time of reading the unique ID from the mobile NFC tag 213 is "no paper", the NFC control unit 404 determines a "URL of paper feed information page" as the URL to be written into the "Payload" field 707 of the NDEF record 708. In this case, the NFC control unit 404 does not confirm the presence/absence of job.

The user management unit 406 manages users registered in the image forming apparatus 103, using the user management table 407. FIG. 9 is a diagram illustrating an example of the user management table 407. The user management table 407 is prestored in the flash ROM 302, for example. The user management unit 406 stores, in the user management table 407, the unique ID stored in the mobile NFC tag 213 of the information processing apparatus 102 held by the user, and an IP address of the information processing apparatus 102, a user name, and authority of the user, in association with one another.

The user management unit 406 identifies the IP address, the user name, and the authority by referring to the user management table 407, according to the unique ID read by the device NFC reader/writer 308 from the mobile NFC tag 213. The user management table 407 pre-registers information of the user 101 who wishes to automatically log in to the general user mode or the administrator mode when the information processing apparatus 102 accesses the RUI of the image forming apparatus 103 with an operation using the NFC. Therefore, the user of the information processing apparatus 102 inputs the unique ID of the mobile NFC tag 213, the IP address, and the user name to the image forming apparatus 103, in advance. The image forming apparatus 103 adds the authority of the user to these pieces of information input from the information processing apparatus 102, and registers the information in the user management table 407. In addition, the NFC control unit 404 identifies the user name from the unique ID by referring to the user management table 407. The NFC control unit 404 can confirm the presence/absence of job of the user by referring to the job management table 402 according to the identified user name.

The RUI control unit 408 accepts the remote management/operation by the information processing apparatus 102 using the RUI. Therefore, the RUI control unit 408 generates an image to be displayed on the web browser of the information processing apparatus 102 by the RUI, and accepts an instruction from the web browser of the information processing apparatus 102. The timer 409 is a counter that measures a time from when the NFC control unit 404 writes the URL of the RUI into the device NFC tag 316 to when the information processing apparatus 102 accesses the URL.

<Operation Form>

The image forming apparatus 103 having the above configuration controls the remote operation when the information processing apparatus 102 is brought close (touched) thereto. The device NFC reader/writer 308 of the image forming apparatus 103 reads the unique ID from the mobile NFC tag 213 of the information processing apparatus 102 when the information processing apparatus 102 is brought close thereto. The NFC control unit 404 of the image forming apparatus 103 confirms the state at the time of reading the unique ID, based on the URL management table 405, and confirms the presence/absence of job of the user 101 based on the user management table 407 and the job management table 402. The NFC control unit 404 of the image forming apparatus 103 determines the URL of the RUI to be written into the device NFC tag 316, by referring to the URL management table 405 according to these confirmation results. The NFC control unit 404 of the image forming apparatus 103 writes, into the device NFC tag 316, a URL for directly accessing the page of the RUI according to a purpose of the user 101.

The information processing apparatus 102 reads the URL of the RUI from the device NFC tag 316 of the image forming apparatus 103 by the mobile NFC reader/writer 212. The information processing apparatus 102 starts the web browser, and accesses the read URL of the RUI.

The RUI control unit 408 of the image forming apparatus 103 detects the access to the RUI, and determines whether the access is within a fixed time from the acquisition of the unique ID by the device NFC reader/writer 308, based on a time count value of the timer 409. If the access is within the fixed time, the RUI control unit 408 of the image forming apparatus 103 determines whether the apparatus accessing the RUI matches the information processing apparatus 102 that has most recently touched the image forming apparatus 103. When the apparatuses match each other, the RUI control unit 408 of the image forming apparatus 103 causes the information processing apparatus 102 to log in to the general user mode or the administrator mode according to the authority held by the information processing apparatus 102 that accesses the RUI. Accordingly, the RUI screen is displayed on the web browser of the information processing apparatus 102. This screen is a screen (page) according to a purpose of the user 101, and the apparatus accessing the RUI enters a logged-in state.

When the access is not within the fixed time, or the apparatus accessing the RUI does not match the information processing apparatus 102 that has most recently touched the image forming apparatus 103, the RUI control unit 408 does not cause the apparatus accessing the RUI to automatically log in. Accordingly, a login screen (a screen for prompting the user to select either the general user mode or the administrator mode, and inputting the password) of the top page of the RUI is displayed on the web browser of the information processing apparatus 102.

Figure 10:
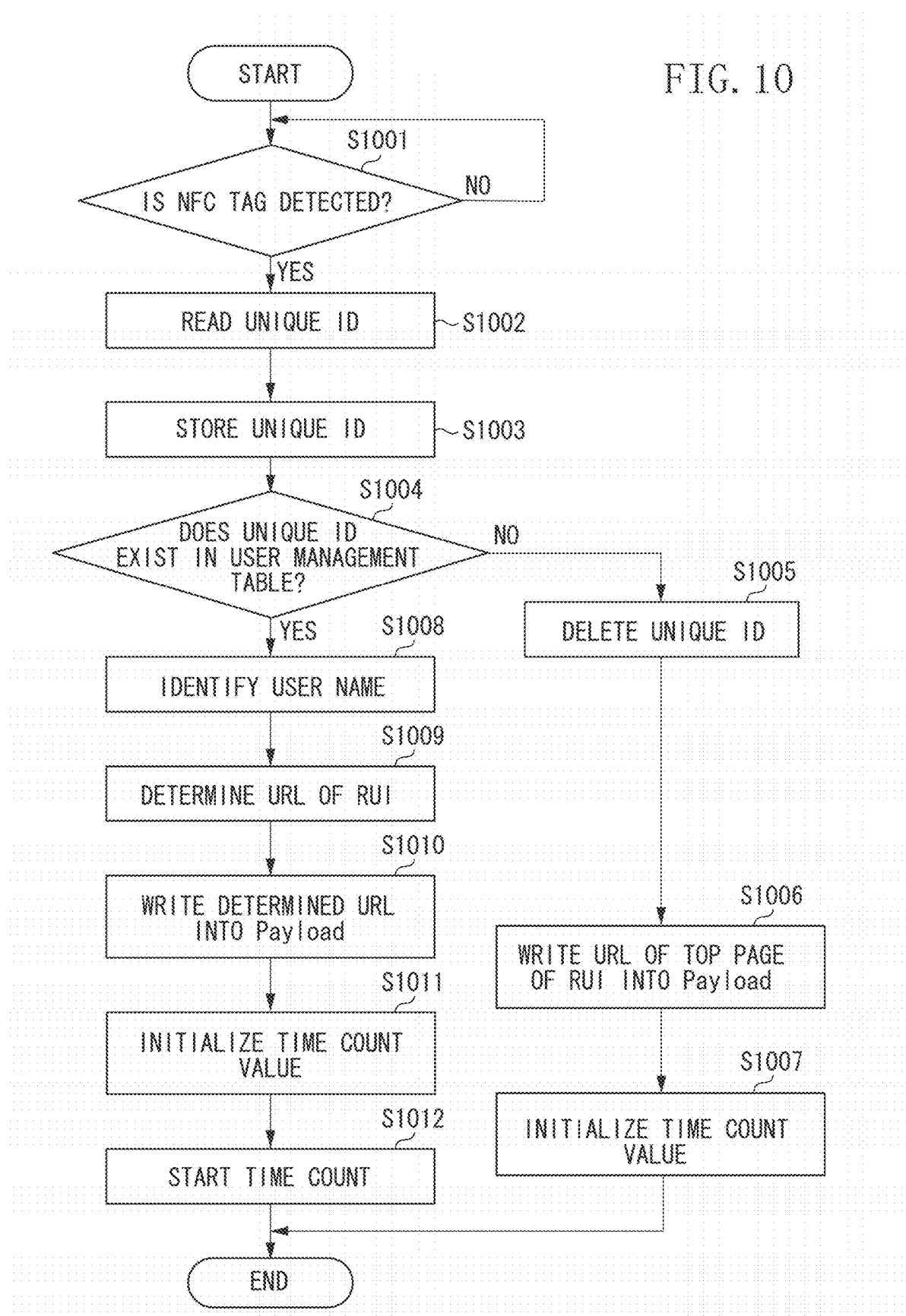
FIG. 10 is a flowchart illustrating processing performed by the image forming apparatus at the time when the information processing apparatus is brought close to the image forming apparatus.

Such processing will be described in detail with the flowcharts of FIGS. 10 to 12. FIG. 10 is a flowchart illustrating processing performed by the image forming apparatus 103 at the time when the information processing apparatus 102 is brought close to the image forming apparatus 103. FIG. 11 is a flowchart illustrating processing performed by the information processing apparatus 102 when the information processing apparatus 102 is brought close to the image forming apparatus 103. FIG. 12 is a flowchart illustrating processing performed by the image forming apparatus 103 when there is an access to the RUI.

As illustrated in FIG. 10, in step S1001, the image forming apparatus 103 polls detection of the mobile NFC tag 213 of the information processing apparatus 102 by the device NFC reader/writer 308. The device NFC reader/writer 308 detects the mobile NFC tag 213 when the information processing apparatus 102 is brought close to the image forming apparatus 103. When the mobile NFC tag 213 of the information processing apparatus 102 is detected (YES in step S1001), in step S1002, the device NFC reader/writer 308 reads the unique ID from the ID area of the mobile NFC tag 213, and in step S1003, stores the unique ID in the RAM 303. Further, in step S1004, the NFC control unit 404 of the image forming apparatus 103 determines whether the read unique ID exists in the user management table 407.

If the unique ID does not exist (NO in step S1004), the NFC control unit 404 determines that the user 101 who has brought the information processing apparatus 102 close to the image forming apparatus 103 should not automatically log in to the RUI, and in step S1005, deletes the unique ID stored in the RAM 303. In step S1006, the NFC control unit 404 writes the URL of the top page of the RUI into the "Payload" field 707 of the smart poster data of the smart poster data area 502 of the device NFC tag 316. Following that, in step S1007, the NFC control unit 404 initializes the time count value of the timer 409 to "0", and terminates the processing.

If the read unique ID exists in the user management table 407 (YES in step S1004), the NFC control unit 404 determines that the user 101 who has brought the information processing apparatus 102 close the image forming apparatus 103 can automatically log in to the RUI. In step S1008, the image forming apparatus 103 identifies the user name corresponding to the read unique ID by referring to the user management table 407. In step S1009, the NFC control unit 404 determines a URL of RUI 803 to be written into the "Payload" field 707, according to the state of the image forming apparatus 103 and the presence/absence of job of the identified user, using the URL management table 405. The NFC control unit 404 confirms the presence/absence of job of the user based on the job management table 402. In step S1010, the NFC control unit 404 writes the determined URL of RUI 803 into the "Payload" field 707 of the smart poster data of the smart poster data area 502 of the device NFC tag 316. Accordingly, the URL for directly accessing the page of the RUI according to a purpose of the user is written into the device NFC tag 316. Following that, in step S1011, the image forming apparatus 103 initializes the time count value of the timer 409 to "0", and then, in step S1012, starts counting of time. Then, the processing ends.

As illustrated in FIG. 11, in step S1101, the information processing apparatus 102 polls detection of the device NFC tag 316 of the image forming apparatus 103 by the mobile NFC reader/writer 212. The mobile NFC reader/writer 212 detects the device NFC tag 316 by being brought close to the image forming apparatus 103 by the user 101 (YES in step S1101).

When the device NFC tag 316 of the image forming apparatus 103 is detected (YES in step S1101), the information processing apparatus 102 determines that the information processing apparatus 102 has been brought close to the image forming apparatus 103. In step S1102, the information processing apparatus 102 reads the smart poster data of the smart poster data area 502 of the detected device NFC tag 316, by the mobile NFC reader/writer 212. In step S1103, the information processing apparatus 102 starts the web browser, and accesses the URL included in the read smart poster data through the network I/F 207. Accordingly, the RUI screen is displayed on the display unit 210 of the information processing apparatus 102. The user operates the image forming apparatus 103 through the RUI screen.

As illustrated in FIG. 12, in step S1201, the image forming apparatus 103 polls detection of an access to the RUI through the network by the RUI control unit 408. When the access to the RUI is detected (YES in step S1201), in step S1211, the RUI control unit 408 of the image forming apparatus 103 acquires, through the network, the IP address of a terminal apparatus that has accessed the image forming apparatus 103. Further, in step S1202, the image forming apparatus 103 determines whether the unique ID is stored in the RAM 303.

If the unique ID is not stored in the RAM 303 (NO in step S1202), the image forming apparatus 103 determines that there is no user who can automatically log in to the RUI. The RUI control unit 408 does not cause the terminal apparatus that has accessed the RUI to log in, and in step S1212, displays the login screen of the top page of the RUI on the web browser of the information processing apparatus 102.

If the unique ID is stored in the RAM 303 (YES in step S1202), the image forming apparatus 103 determines that there is a user who can automatically log in to the RUI. In step S1203, the RUI control unit 408 determines whether the time count value of the timer 409 is the fixed value or less. When the time count value is not the fixed value or less (NO in step S1203), the RUI control unit 408 determines that the processing for causing the terminal apparatus that has accessed the RUI to log in has reached a timeout. Then, the RUI control unit 408 does not cause the terminal apparatus accessing the RUI to log in, and in step S1212, displays the login screen of the top page of the RUI on the web browser of the information processing apparatus 102.

When the time count value is the fixed value or less (YES in step S1203), in step S1204, the RUI control unit 408 reads the unique ID stored in the RAM 303. In step S1205, the RUI control unit 408 identifies the IP address corresponding to the read unique ID by referring to the user management table 407. In step S1206, the RUI control unit 408 determines whether the identified IP address matches the IP address of the terminal apparatus acquired through the network in step S1211. That is, the RUI control unit 408 compares the IP address acquired through the network with the IP address identified from the unique ID, using the IP addresses as identification information for identifying the information processing apparatus 102. When the IP addresses do not match each other (NO in step S1206), the RUI control unit 408 determines that the terminal apparatus that has accessed the RUI is not the information processing apparatus 102 that has performed the NFC in step S1002 of FIG. 10. Then, the RUI control unit 408 does not cause the terminal apparatus that has accessed the RUI to log in, and in step S1212, displays the login screen of the top page of the RUI on the web browser of the information processing apparatus 102.

When the IP addresses match each other (YES in step S1206), the RUI control unit 408 determines that the terminal apparatus that has accessed the RUI is the information processing apparatus 102 that has performed the NFC in step S1002 of FIG. 10. In step S1207, the RUI control unit 408 identifies authority 904 for the read unique ID by referring to the user management table 407. The RUI control unit 408 causes the terminal apparatus with the identified IP address that has accessed the RUI to log in according to the identified authority. In step S1208, the RUI control unit 408 displays the page of the RUI to which the terminal apparatus has logged in, on the web browser of the information processing apparatus 102.

When the top page of the RUI or the page of the RUI to which the terminal apparatus has logged in is displayed on the web browser of the information processing apparatus 102, in step S1209, the RUI control unit 408 deletes the unique ID from the RAM 303. Further, in step S1210, the RUI control unit 408 initializes the time count value of the timer 409 to "0", and terminates the processing.

The above-described image forming apparatus 103 saves the effort of the input of the password when the information processing apparatus 102 accesses the URL of the RUI acquired by the NFC. Therefore, the operability of the user is improved. Further, according to the authority of a user who accesses the RUI, the image forming apparatus 103 can cause the user to automatically log in to the general user mode or the administrator mode. Only the information processing apparatus 102 that has performed communication with the image forming apparatus 103 by the NFC in advance is caused to automatically log in. Therefore, security is maintained. The image forming apparatus 103 can display the page of the RUI according to a purpose of the user, on the display unit 210 of the information processing apparatus 102 according to the state. As described above, the operability of the user of when the image forming apparatus 103 is remotely controlled by the information processing apparatus 102 is improved. In the above exemplary embodiment, the image forming apparatus 103 having a printer function has been described as an example. However, the present invention may be applied to an image forming apparatus having a scanner function, a copying function, or the like, and the present invention can be applied to an image processing apparatus having only a part of these functions.

As described above, according to the above exemplary embodiment, if first identification information and second identification information identify the same external device, the remote operation by the external device is determined to have already logged in. Therefore, the user of the external device can save the effort of login while maintaining security, and the operability is improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-171646, filed Aug. 26, 2014, which is hereby incorporated by reference herein in its entirety.

What is claimed is:

1. An image forming apparatus that provides an external apparatus accessing the image forming apparatus with a remote operation screen which is for the external apparatus to remotely control the image forming apparatus, the image forming apparatus comprising:
   at least one processor and a memory coupled to the at least one processor, the memory storing instructions that, when executed by the at least one processor controls
   an NFC control unit configured to execute proximity wireless communication and acquire, from an external apparatus brought close to the image forming apparatus, identification information of the external apparatus;
   a determining unit configured to determine, in a case where an access for requesting the remote operation screen occurs, whether the external apparatus accessing the image forming apparatus matches the external apparatus indicated by the acquired identification information; and
   a providing unit configured to provide, in a case where the determination unit determines that the external apparatus accessing the image forming apparatus does not match the external apparatus indicated by the acquired identification information, the external apparatus accessing the image forming apparatus with a login screen which is for the external apparatus to log in to the remote operation screen, and in a case where the determination unit determines that the external apparatus accessing the image forming apparatus matches the external apparatus indicated by the acquired identification information, the external apparatus accessing the image forming apparatus with the remote operation screen instead of the login screen.

2. The image forming apparatus according to claim 1, wherein in a case where the NFC control unit has not acquired identification information, the providing unit provides the external apparatus accessing the image forming apparatus with the login screen.

3. The image forming apparatus according to claim 1, wherein the login screen is a screen for requesting a user to input at least a password.

4. The image forming apparatus according to claim 1, wherein the NFC control unit stores a uniform resource locator (URL) indicating the remote operation screen, and the external apparatus brought close to the image forming apparatus accesses the image forming apparatus based on the URL.

5. A method for controlling remote operation of an image forming apparatus that provides an external apparatus accessing the image forming apparatus with a remote operation screen which is for the external apparatus to remotely control the image forming apparatus, the method being executed by the image forming apparatus including an NFC control unit configured to perform proximity wireless communication with an external device the method comprising:
   executing proximity wireless communication to acquire, from an external apparatus brought close to the image forming apparatus, identification information of the external apparatus;
   determining, in a case where an access for requesting the remote operation screen occurs, whether the external apparatus accessing the image forming apparatus matches the external apparatus indicated by the acquired identification information; and
   providing, in a case where it is determined that the external apparatus accessing the image forming apparatus does not match the external apparatus indicated by the acquired identification information, the external apparatus accessing the image forming apparatus with a login screen which is for the external apparatus to log in to the remote operation screen, and in a case where the determination unit determines that the external apparatus accessing the image forming apparatus matches the external apparatus indicated by the acquired identification information, the external apparatus accessing the image forming apparatus with the remote operation screen instead of the login screen.

6. A non-transitory computer readable storage medium that stores instructions, that when executed by at least one processor, control an image forming apparatus including an NFC control unit configured to perform proximity wireless communication with an external device to execute a method comprising:
   executing proximity wireless communication to acquire, from an external apparatus brought close to the image forming apparatus, identification information of the external apparatus;
   determining, in a case where an access for requesting the remote operation screen occurs, whether the external apparatus accessing the image forming apparatus matches the external apparatus indicated by the acquired identification information; and
   providing, in a case where it is determined that the external apparatus accessing the image forming apparatus does not match the external apparatus indicated by the acquired identification information, the external apparatus accessing the image forming apparatus with a login screen which is for the external apparatus to log in to the remote operation screen, and in a case where the determination unit determines that the external apparatus accessing the image forming apparatus matches the external apparatus indicated by the acquired identification information, the external apparatus accessing the image forming apparatus with the remote operation screen instead of the login screen.

* * * * *